(12) United States Patent
Grein et al.

(10) Patent No.: US 8,173,747 B2
(45) Date of Patent: May 8, 2012

(54) STERILISABLE AND TOUGH IMPACT POLYPROPYLENE COMPOSITION

(75) Inventors: Christelle Grein, Linz (AT); Tonja Schedenig, Enns (AT)

(73) Assignee: Borealis Technology Oy, Porvoo (FI)

( * ) Notice: Subject to any disclaimer, the term of this patent is extended or adjusted under 35 U.S.C. 154(b) by 16 days.

(21) Appl. No.: 12/733,082

(22) PCT Filed: Aug. 6, 2008

(86) PCT No.: PCT/EP2008/060306
§ 371 (c)(1),
(2), (4) Date: Feb. 5, 2010

(87) PCT Pub. No.: WO2009/019277
PCT Pub. Date: Feb. 12, 2009

(65) Prior Publication Data
US 2010/0249329 A1  Sep. 30, 2010

(30) Foreign Application Priority Data
Aug. 8, 2007 (EP) ..................................... 07114025

(51) Int. Cl.
*C08F 8/00* (2006.01)
*C08L 23/00* (2006.01)
(52) U.S. Cl. ....................................... 525/191; 525/240
(58) Field of Classification Search .................. 525/191, 525/240
See application file for complete search history.

(56) References Cited

U.S. PATENT DOCUMENTS

| | | | |
|---|---|---|---|
| 3,300,459 A | 1/1967 | Natta et al. | |
| 5,919,877 A | 7/1999 | Tanaglia | |
| 6,511,755 B1 | 1/2003 | Mochizuki et al. | |
| 7,279,526 B2 * | 10/2007 | Malm et al. | 525/191 |
| 2004/0034167 A1 | 2/2004 | Schardl et al. | |

FOREIGN PATENT DOCUMENTS

| | | |
|---|---|---|
| EP | 0 060 090 A1 | 9/1982 |
| EP | 0 170 255 A1 | 2/1986 |
| EP | 0 373 660 A2 | 6/1990 |
| EP | 1 135 440 B1 | 8/2004 |
| EP | 1 373 403 B1 | 4/2005 |
| EP | 1 681 315 A1 | 7/2006 |
| WO | WO 97/49744 | 12/1997 |
| WO | WO2004/056567 A2 | 7/2004 |
| WO | WO2005/040270 | 5/2005 |
| WO | WO2009/019277 A1 | 2/2009 |

OTHER PUBLICATIONS

EniChem "Dutral, Ethylene-Propylene Elastomers", pp. 1-4 (1991).

* cited by examiner

*Primary Examiner* — Nathan M Nutter
(74) *Attorney, Agent, or Firm* — Warn Partners, P.C.

(57) ABSTRACT

The present invention relates to a heterophasic polypropylene composition which is sterilizable and has a high impact strength as well as improved optical properties both before and after a step of heat sterilization. Furthermore, the present invention relates to a film comprising said heterophasic polypropylene composition, and to the use of said composition for the production of a film. Finally, the present invention is directed to the use of such a film as a packaging material for medicals and/or food. The heterophasic polypropylene composition comprises a matrix resin which comprises (A) a propylene homopolymer and (B) a propylene random copolymer; and a dispersed phase which comprises (C) an ethylene-propylene rubber wherein (i) the melting point of the heterophasic polypropylene composition is at least 145° C. and (ii) the content of comonomer in the matrix resin is at least 0.5 wt % based on the entire matrix resin without any additives.

8 Claims, 5 Drawing Sheets

STERILISABLE AND TOUGH IMPACT POLYPROPYLENE COMPOSITION

This application is a National Stage of International Application No. PCT/EP2008/060306, filed Aug. 6, 2008. This application claims priority to European Patent Application No. 07114025.5 filed on Aug. 8, 2007. The disclosures of the above applications are incorporated herein by reference.

The present invention relates to heterophasic polypropylene compositions which are sterilisable and have a high impact strength as well as improved optical properties both before and after a step of heat sterilisation. Furthermore, the present invention relates to films comprising such a heterophasic polypropylene composition, and to the use of said compositions for the production of films. Finally, the present invention is directed to the use of such films as packaging material for medicals and/or food.

Polyolefin compositions and films comprising said compositions with high sterilisation resistance are gaining more and more interest, particularly in the field of packaging materials for medicals and food. The requirements for such films are high transparency (i.e. low haze) and impact resistance. It is desirable that both properties are maintained after a step of heat sterilisation, which is however difficult to achieve for both properties. By "sterilisation resistance" a minimisation of both the loss of transparency (i.e. the increase in haze) and the impact resistance after heat sterilisation is meant. A further requirement for modern packaging applications for medicals and food is a certain softness of the material, which should remain as low as possible.

Polypropylene compositions with high impact resistance are known in the art and are e.g. disclosed in EP 0 170 255 A1. Therein polypropylene compositions having a high impact resistance and an improved whitening resistance are described. Said compositions comprise a polypropylene (60-90 parts by weight) having an isotacticity index >90 and an ethylene/1-butene polymeric fraction (10-40 parts by weight) containing 50-95 wt % of ethylene and consisting of a crystalline fraction (20-95 wt %) and an amorphous fraction (5-80 wt %) distinguished by the amount of xylene solubles. The invention was based on the substitution of a propylene-ethylene rubber with said ethylene-1-butene rubber. This document and the prior art disclosed therein is typical for the use of heterophasic polymer compositions comprising a polypropylene base resin and a rubber which is known to improve the impact resistance.

One drawback of the above-mentioned heterophasic compositions is the loss of transparency, which usually occurs when the flowability between the two phases is significantly different. EP 0 373 660 A2 discloses propylene polymer compositions having good transparency and improved impact resistance. Said compositions comprise 70-98 wt % of a crystalline copolymer of propylene with ethylene and/or a $C_2$-$C_8$-alpha-olefin and 2-30 wt % of an elastomeric propylene-ethylene copolymer along with suitable ratios between the intrinsic viscosity of the different phases.

Also WO 97/49744 discloses a polyolefin composition with high transparency and high flexibility and is based on the finding that the balance between flexibility and transparency of heterophasic polyolefin compositions can be further improved by increasing the amount of the elastomeric phase and at the same time decreasing the ethylene content of said elastomeric phase. Therefore, a composition is disclosed comprising 10-20 parts by weight of a homopolymer of propylene or a copolymer of propylene (at least 95 wt % of propylene derived units) with ethylene and/or one or more a $C_2$-$C_6$-alpha-olefins; 5-20 parts by weight of a propylene copolymer fraction containing ethylene derived units and being insoluble in xylene; and 60-80 parts by weight of a propylene copolymer fraction being soluble in xylene and containing 15-25 wt % of units derived from a comonomer selected from ethylene and mixtures of ethylene with one or more $C_2$-$C_6$-alpha-olefins; and wherein the sum of the latter two fractions amounts 80-90 wt % of the total polyolefin composition.

U.S. Pat. No. 6,511,755 B1 is directed to a polypropylene film for high-temperature sterilisation packing with excellent transparency and impact resistance at low temperature and additionally prevented deterioration of transparency after heating. A polypropylene composition is disclosed comprising a crystalline polypropylene-alpha-olefin copolymer (90-98.5 wt % of propylene) and a copolymer of propylene and an alpha-olefin (20-55 wt % of alpha-olefin), the preferred comonomer for both fractions being ethylene.

EP 1 135 440 B1 is directed to impact-resistant polyolefin compositions for food-contact applications with a good balance of processability, mechanical properties and optical properties. The disclosed compositions comprise 60-95 wt % of a crystalline polypropylene component having a $MFR_2$ of 2.5-50 g/10 min and containing 20-80 wt % of a first fraction having a $MFR_2$ of 0.5-8 g/10 min and 20-80 wt % of a second fraction; and 5-40 wt % of a copolymer of ethylene with 10-40 wt % of one or more $C_4$-$C_{10}$-alpha-olefins.

Many of the polyolefin compositions of the prior art also discussed above are heterophasic and comprise a base resin which is a random copolymer of propylene and ethylene and comprise as a second component an elastomeric copolymer comprising at least two comonomers selected from ethylene and alpha-olefins, the so called rubber, often an ethylene-propylene rubber, EPR. These compositions are often addressed as heterophasic copolymers of polypropylene or random heterophasic copolymers of polypropylene.

However, even if these compositions are designed for high transparency and high impact resistance, there is still a need for improving these properties and also for ensuring that both properties are maintained after a step of heat sterilisation.

In improving all these properties however, one is faced with a conflict of objectives:

It is known that in the above-mentioned heterophasic compositions the impact resistance is influenced by the amount and size of the EPR particles. The larger the amount of EPR particles, the higher the impact resistance. Still further, the optimum size of the EPR particles is dependent on temperature, test speed and stress field. For a high impact resistance it is advantageous to have a high amount of small EPR particles.

It is further known, that the impact resistance of a heterophasic propylene copolymer having a matrix copolymer of propylene and ethylene is improved as compared to a heterophasic propylene copolymer having a matrix propylene homopolymer. The impact resistance increases with increasing comonomer content, e.g. ethylene content.

The optical properties of heterophasic systems are also known to be dependent on the EPR particles and on the content of comonomer in the matrix resin. Generally, for achieving high transparency in two-phasic systems it is necessary to design a system where no scattering of light occurs at the phase boundaries. This can be achieved by proper selection of the refractive index of the two phases and/or by providing a dispersed phase which has a particle size below the wavelength of visible light, i.e. below about 400 nm.

The refractive index is directly related to the density of the two phases in case of alpha-olefin polymers and is therefore inter alia dependent on the content of comonomer of both phases. Typically the matrix of a heterophasic propylene random copolymer has a density in between 0.900 and 0.905 g/cm³ whereas the density of an ethylene-propylene rubber is about 0.860-0.880 g/cm³. Therefore, these systems are usually not highly transparent. One method of improving the transparency of such compositions is to add a linear low density polyethylene with a typical density of 0.915-0.923 g/cm³. Due to higher compatibility with the EPR-phase this additional component diffuses into the EPR-phase and thereby increases the overall density of the dispersed phase. Alternatively, the particle size of the dispersed phase is tailored to be less than 400 nm. The particle size of the dispersed phase is influenced by the ratio of viscosity of the matrix resin and the dispersed phase and by the content of comonomer, in particular the content of ethylene, of both the dispersed fraction and the matrix resin.

Therefore, for providing a heterophasic composition with high impact resistance and high transparency it is necessary to have a high amount of small particles as the dispersed phase and a high content of comonomer, particularly ethylene, in the matrix resin.

It is also known that the melting point of a propylene copolymer is decreasing with increasing amount of comonomer, particularly ethylene. This decrease is quasi-linear. A propylene homopolymer has a melting point of about 165° C., a propylene copolymer containing 5 wt % of ethylene has a melting point of about 138-140° C.

Heat sterilisation is currently carried out by a treatment with saturated steam at 121° C. for 30 minutes. Where in this application the term "heat sterilisation" is used, it stands for these conditions mentioned above.

It is known that after a step of heat sterilisation both the impact resistance and the optical properties of the known heterophasic materials are deteriorated. It is believed that the rather low melting points of the matrix resins—which are due to the rather high content of comonomer for achieving the requirements of impact resistance and transparency—allow a certain mobility of the dispersed phase. Even if the sterilisation temperature is still below the melting point of the matrix resin, the latter already softens. Due to higher compatibility of the dispersed particles with each other compared to the matrix resin, there is a strong tendency of agglomeration of the dispersed particles. As a result the size of the dispersed particles is increased after heat sterilisation. This morphology is retained after cooling down. The consequence is a deterioration of the transparency as already discussed above. Still further, also the impact resistance is deteriorated.

It is further desirable, that polyolefin compositions which are used for films for medical packaging and for food packaging should have a certain softness. This required softness, together with high transparency high impact resistance, was not achievable with polyolefin compositions from the prior art. It is also desirable that an eventual increase in stiffness after heat sterilisation is as small as possible (or even negative).

To sum up, an increasing content of a comonomer, particularly ethylene, in the matrix resin improves the impact resistance and the transparency of the known heterophasic compositions but at the same time deteriorates the sterilisation resistance, i.e. deteriorates both impact resistance and transparency after the step of heat sterilisation.

Hence, there was a strong need for improved materials which have high transparency, high impact resistance, good softness and high sterilisation resistance and avoid the above mentioned conflict of objectives.

It is therefore the object of the present invention to provide such materials, particularly in view of the application of such materials for films used in the field of packaging materials for medicals and food.

The present invention is based on the surprising finding that the above mentioned object can be achieved by providing a polypropylene composition comprising a matrix resin and an elastomeric resin as a dispersed phase, wherein the matrix resin comprises a propylene homopolymer and a propylene copolymer and wherein the dispersed phase comprises an ethylene-propylene rubber.

The conflict of objectives is solved by the surprising finding that the melting temperature of the heterophasic polypropylene composition as a function of the content of comonomer of the matrix resin shows a deviation from linear behaviour. It is thereby possible to select a content of comonomer of the matrix resin which is high enough to ensure high transparency and high impact resistance but at the same time is low enough to avoid the unfavourable effects of decreasing melting temperature of the heterophasic polypropylene composition on sterilisation resistance as discussed above.

Accordingly, the present invention provides a heterophasic polypropylene composition comprising a matrix resin which comprises
 (A) a propylene homopolymer and
 (B) a propylene random copolymer;
and a dispersed phase which comprises
 (C) an ethylene-propylene rubber
wherein
 (i) the melting point of the heterophasic polypropylene composition is at least 145° C. and
 (ii) the content of comonomer in the matrix resin is at least 0.5 wt % based on the entire matrix resin without any additives.

Preferably, the melting point of the heterophasic polypropylene composition is at least 150° C., more preferably at least 155° C., still more preferably at least 158° C.

Generally, higher melting temperatures of the heterophasic polypropylene composition are preferred.

Preferably, the content of comonomer in the matrix resin is at least 0.5 wt %, more preferably at least 0.8 wt %, still more preferably at least 1.5 wt % based on the entire matrix resin without any additives. It is also preferable that the content of comonomer in the matrix resin is not higher than 4.0 wt %.

Component (A) may consist of a single propylene homopolymer fraction, but (A) may also comprise a mixture of different propylene homopolymer fractions. This also applies for all preferred embodiments of component (A).

The same applies for each of components (B) and (C), i.e. they may each consist of a single fraction, but may also comprise a mixture of different fractions. This also applies for all preferred embodiments of components (B) and (C).

Where the propylene homopolymer, the propylene copolymer, or the ethylene-propylene rubber comprise more than one fraction, these fractions may have a different average molecular weight, a different molecular weight distribution, or in case of the propylene copolymer and of the ethylene-propylene rubber, a different content of comonomer.

The term molecular weight where used herein denotes the weight average molecular weight $M_w$.

It is preferred that the comonomer of propylene copolymer (B) is ethylene and/or a $C_4$-$C_{10}$ alpha-olefin like 1-butene, 1-pentene, 1-hexene, 1-heptene, 1-octene etc. or a mixture thereof. Especially preferred, in the present invention the comonomer is ethylene.

Preferably the heterophasic polypropylene composition according to the invention comprises 10-85 wt % of the propylene homopolymer (A), 10-85 wt % of the propylene copolymer (B) and 5-30 wt % of the ethylene-propylene rubber (C).

Preferably, component (A) has an $MFR_2$ of 0.5-20 g/10 min, more preferably an $MFR_2$ of 1-8 g/10 min.

Preferably, component (B) has an $MFR_2$ of 0.5-20 g/10 min, more preferably an $MFR_2$ of 1-8 g/10 min.

Preferably, the comonomer content of component (B) is 2-5 wt %.

Preferably, component (B) is a random propylene-ethylene copolymer.

Preferably, the intrinsic viscosity of the xylene soluble content of the heterophasic polypropylene composition is from 1-2 dl/g.

Preferably, the xylene soluble content of the heterophasic polypropylene composition has a content of propylene of more than 40 wt %, more preferably of more than 50 wt %, still more preferably of more than 55 wt %. It is further preferred that the content of propylene is not more than 80 wt %.

In a particular preferred embodiment the heterophasic polypropylene composition according to the invention comprises a matrix resin which comprises (A) 20-70 wt % based on the heterophasic polypropylene composition of a propylene homopolymer with an $MFR_2$ of 1-8 g/10 min and (B) 20-70 wt % based on the heterophasic polypropylene composition of a propylene-ethylene random copolymer with an $MFR_2$ of 1-8 g/10 min;

wherein the ethylene content of the matrix resin is 0.5-4.0 wt % based on the entire matrix resin without any additives;

and a dispersed phase which comprises (C) 10-30 wt % based on the heterophasic polypropylene composition of an ethylene-propylene rubber, wherein the xylene soluble content of the heterophasic polypropylene composition has an intrinsic viscosity of 1-2 dl/g and a content of propylene of more than 50 wt %.

Preferably, the propylene homopolymer (A) has a xylene solubles content of up to 2.5 wt %, more preferably of $\leq 1.5$ wt %, based on the propylene homopolymer (A).

Preferably, the propylene-ethylene random copolymer (B) has a xylene solubles content of 0.5-10 wt %, still more preferably of 1-9 wt %, most preferably of 1.5-8 wt %.

Preferably, the melting point of the heterophasic polypropylene composition according to the particular preferred embodiment mentioned above is at least 145° C., more preferably 150° C., still more preferably at least 155° C., and particular preferred at least 158° C.

Preferably, the $MFR_2$ of the heterophasic polypropylene composition according to the invention is from 0.5 to 20 g/10 min, preferably from 1 to 8 g/10 min.

The impact strength of the inventive heterophasic polypropylene composition according to the Charpy notched impact strength test according to ISO 179 1eA is preferably at least 10 $kJ/m^2$ at +23° C., more preferably at least 25 $kJ/m^2$, still more preferably at least 30 $kJ/m^2$ and most preferably at least 34 $kJ/m^2$, and at a temperature of −20° C. at least 1.5 $kJ/m^2$.

After a step of heat sterilization at 121° C. for 0.5 h the impact strength of the inventive heterophasic polypropylene composition according to the Charpy notched impact strength test according to ISO 179 1eA is preferably at least 25 $kJ/m^2$ at +23° C., more preferably at least 35 $kJ/m^2$, still more preferably at least 45 $kJ/m^2$ and most preferably at least 60 $kJ/m^2$ and at a temperature of −20° C. at least 1.2 $kJ/m^2$.

The haze of the inventive heterophasic polypropylene composition is preferably 40%, more preferably 31% when measured on a 60×60×0.5 mm plaques according to ASTM D 1003-92.

After a step of heat sterilization at 121° C. for 0.5 h the haze of the inventive heterophasic polypropylene composition is preferably below 50%, more preferably below 45% when measured on a 60×60×0.5 mm plaques according to ASTM D 1003-92.

The increase in haze (Δ(haze)) of the inventive heterophasic polypropylene composition before and after a step of heat sterilization at 121° C. for 0.5 h is preferably below 50%, based on the haze before heat sterilization.

The intrinsic viscosity of the xylene soluble content of the inventive heterophasic polypropylene composition is preferably below 2 more preferably below 1.8 dl/g.

It has been found that with such heterophasic polypropylene compositions films can be produced which have high transparency and high impact strength and at the same time have a high sterilisation resistance.

Accordingly, the present invention is also directed to a film comprising the inventive heterophasic polypropylene compositions mentioned above. Preferably, the film consists of the inventive heterophasic polypropylene compositions mentioned above.

Preferably, the film is a cast film or a blown film.

Preferably, the film is non-oriented or mono- or biaxially oriented.

Still more preferably, the film is a cast film.

A 100 μm thick cast film made of the heterophasic propylene composition of the present invention preferably shows a transparency above 85%, more preferred above 90% and even more preferred above 93% according to the measurement of ASTM D 1003-92.

Similarly, the haze of such a film is preferably below 20%, more preferably below 15% and still more preferably below 13.4% according to the measurement of ASTM D 1003-92.

After a step of heat sterilization at 121° C. for 0.5 h a 100 μm thick film made of the heterophasic propylene composition of the present invention preferably shows a transparency above 85%, more preferred above 88% and even more preferred above 91% according to the measurement of ASTM D 1003-92.

Similarly, the haze of such a treated film is preferably below 22%, more preferably below 19%, still more preferably not more than 17% according to the measurement of ASTM D 1003-92.

Finally, the increase in haze (Δ(haze)) of such a film after and before such a treatment is preferably 70% or less, more preferably 50% or less, still more preferably 30% or less, in each case based on the haze before heat sterilisation.

The impact strength of such a film before heat sterilisation is preferably at least 13 J/mm according to ISO 7765-2, more preferably at least 17 J/mm.

After a step of heat sterilization at 121° C. for 0.5 h the impact strength of such a film is preferably at least 9.0 J/mm.

The present invention is also directed to the use of any of the inventive heterophasic polypropylene compositions mentioned above for producing a film, particularly a cast film.

The present invention is also directed to the use of a film, preferably a cast film, comprising, preferably consisting of, any of the inventive heterophasic polypropylene compositions mentioned above as a packaging material for medical applications and/or food.

The inventive heterophasic polypropylene compositions mentioned above may be produced by separately preparing each of the polymers (A), (B) and (C) and mixing the resins afterwards as known in the art.

In a preferred embodiment of the present invention, the inventive heterophasic polypropylene compositions mentioned above are produced in a sequential multi-step process utilising reactors coupled in series and using different conditions in each reactor.

Preferably, the propylene homopolymer (A) is produced in the first reactor, followed by production of the propylene random copolymer (B) in a second reactor in the presence of propylene homopolymer (A) and followed by the production of ethylene-propylene rubber (C) in the presence of (A) and (B).

Preferably, the homopolymer (A) is produced in a slurry reactor, still more preferred in a loop reactor.

Preferably, the copolymer fraction (B) is produced in a gas phase reactor.

Preferably, the ethylene-propylene rubber (C) is produced in a gas phase reactor.

When the propylene homopolymer (A) and/or the propylene copolymer (B) and/or the ethylene-propylene rubber comprise more than one fraction, it is preferred that each of the fractions is prepared in its own reactor, wherein the reactors are connected in series and the process is carried out in the presence of all fractions produced before.

The heterophasic propylene compositions of the invention may be produced by separate polymerisation of each of its components and by melt blending the components.

The heterophasic propylene compositions of the invention may further be produced by polymerising a heterophasic propylene copolymer comprising a propylene homopolymer (A) matrix and an ethylene-propylene rubber (C) and by melt blending the heterophasic propylene copolymer with a separately polymerised propylene random copolymer (B).

The heterophasic propylene compositions of the invention may further be produced by polymerising a heterophasic propylene random copolymer (also called RAHECO) comprising a propylene random copolymer (B) matrix and an ethylene-propylene rubber (C) and by melt blending the heterophasic propylene random copolymer with a separately polymerised propylene homopolymer (A).

Still further, the heterophasic propylene compositions of the invention may be produced by polymerising a heterophasic propylene random copolymer comprising a propylene random copolymer (B) matrix and an ethylene-propylene rubber (C) and by melt blending the heterophasic propylene random copolymer with a separately polymerised heterophasic propylene copolymer comprising a propylene homopolymer (A) matrix and an ethylene-propylene rubber (C).

Production of Propylene Random Copolymer (B) and Propylene Homopolymer (A)

The polymerisation process for the production of the random propylene copolymers according to the invention may be a continuous process or a batch process utilising known methods and operating in liquid phase, optionally in the presence of an inert diluent, or in gas phase or by mixed liquid-gas techniques. Accordingly, the random propylene copolymer may be produced by single- or multistage process polymerisation of propylene and α-olefin and/or ethylene such as bulk polymerisation, gas phase polymerisation, slurry polymerisation, solution polymerisation or combinations thereof using conventional catalysts. Preferably, the copolymer is made either in one or two loop reactor(s) or in a combination of loop and gas phase reactor. Those processes are well known to one skilled in the art.

The process is preferably carried out in the presence of a stereospecific catalyst system.

A suitable catalyst for the polymerisation of the propylene polymer is any stereospecific catalyst for propylene polymerisation which is capable of polymerising and copolymerising propylene and α-olefin-comonomers at a temperature of 40 to 110° C. and at a pressure from 10 to 100 bar. Ziegler Natta catalysts as well as metallocene catalysts are suitable catalysts.

One skilled in the art is aware of the various possibilities to produce propylene homo- and copolymers and will simply find out a suitable procedure to produce suitable polymers which are used in the present invention, see e.g. Nello Pasquini (Ed.) Polypropylene Handbook, Hanser, Munich, 2005, pages 15-141.

As Ziegler-Natta catalyst any ordinary stereospecific Ziegler-Natta catalysts can be used. An essential component in those catalysts are solid catalyst components comprising a titanium compound having at least one titanium-halogen bond, an internal electron donor compound and a magnesium halide in active form as a carrier for both the titanium component and the donor compound. The catalysts can contain—as internal electron donor—compounds selected from ethers, ketones, lactones, compounds containing N, P and/or S atoms and esters of mono and dicarboxylic acids. Preferred are aromatic esters like benzoates or phthalates, e.g. ethyl benzoate or, diisobutylphtalate, or diethers like 2,2-diisopropyl-1,3-dimethoxypropene.

A further essential component of the catalyst is a cocatalyst, an organoaluminium compound, such as an alkylaluminium compound, preferably triethyl-aluminium (TEAl) or tri-isobutyl-aluminium.

Additionally, an external electron donor is generally used. Preferred are external donors according to the formula

$R_xR'_ySi(MeO)_{4-x-y}$, wherein R and R' are identical or different and are branched or cyclic aliphatic or aromatic hydrocarbon residues, and y and x independently from each other are 0 or 1, provided that x+y are 1 or 2.

Particularly preferred external donors are dicyclopentyldimethoxysilane and cyclohexyldimethoxymethylsilane.

To obtain the random propylene copolymer, it is preferred to use a polymerisation process based on a first polymerisation step in at least one slurry reactor and an optional second polymerisation step preferably comprising at least one gas phase reactor. Preferred slurry reactors are loop reactors.

Preferred reactor arrangements for producing the random propylene copolymer are a single loop reactor or two consecutive loop reactors or a loop reactor followed by a gas phase reactor.

Before the catalyst system is used in the actual polymerisation process it is optionally pre-polymerised with small amounts of α-olefins, preferably propylene, in order to enhance catalyst performance and to improve the morphology of the end product.

In the first polymerisation step of the process the optionally prepolymerised catalyst system and a monomer feed comprised of propylene, and one or more of ethylene and/or $C_4$-$C_{10}$ α-olefins is fed into a reactor. Preferably, the $C_4$-$C_{10}$ α-olefin can be any one or mixtures of 1-butene, 4-methyl-1-pentene, 1-hexene or 1-octene. Particularly preferred are ethylene and 1-butene. The amount of comonomer in the feed can be up to 40 wt %.

Polymerisation can be carried out in the presence of the previously mentioned organoaluminium compound and an external donor compound at temperatures lower than 110° C. and pressures in the range of 10 to 100 bar, preferably 30 to 70 bar. The polymerisation is carried out in such conditions that 50 to 100 wt %, preferably 75 to 99 wt % of the end product is polymerised in the first reactor.

Any metallocene catalyst capable of catalysing the formation of a propylene polymer can also be used. A suitable metallocene catalyst comprises a metallocene/activator reaction product, which is typically impregnated in a porous support at maximum internal pore volume. The catalyst complex comprises a ligand which is typically bridged, and a transition metal of group IVa . . . VIa, and an organoaluminium compound. The catalytic metal compound is typically a metal halide, e.g. $ZrCl_2$.

In the first polymerisation step a polymer is produced, in which the content of comonomer is in the range of up to 18.0 wt %, preferably up to 10 wt %. Hydrogen is added, when desired, into the first reactor for adjusting the molecular weight of polymer, as conventional.

After the polymerisation is complete in the first reactor, the reaction medium is optionally transferred into a second reactor, which can be a gas phase reactor.

If the second reactor is also a loop reactor, the same range of polymerisation conditions is available as for the first reactor.

In the optional second reactor, 0 to 50 wt %, preferably 1 to 25 wt % of the final polymer is formed. In the second reactor, if it is a gas phase reactor, the polymerisation can be carried out at a temperature of 60 to 90° C. and at a pressure higher than 5 bar, preferably higher than 10 bar. Optionally, propylene and other monomers can be added into the second reactor. Hydrogen can also be added into the gas phase reactor, if desired.

The precise control of the polymerisation conditions and reaction parameters is within the state of the art. After the polymerisation in the first and the optional second reactor is finished, the polymer product is recovered by conventional procedures.

The resulting polymer particles may be pelletised in a conventional compounding extruder with various additives, which are generally used in thermoplastic polymer compositions, such as stabilisers, antioxidants, acid neutralising agents, ultraviolet absorbers, antistatic agents, etc.

Production of propylene homopolymer (A) may be performed in an analogous manner, with the exception, that no comonomer (ethylene) is used in the polymerisation.

Production of Ethylene-Propylene Rubber (C)

Ethylene-propylene rubbers can either be synthesised in the latter step(s) of a multistage process, where in the first step(s) a random copolymer and/or a propylene homopolymer is synthesised or, alternatively, ethylene-propylene rubber can be polymerised separately and mixed with the random copolymer and the homopolymer component in a separate melt blending step.

An ethylene propylene rubber may be produced by known polymerisation processes such as solution, suspension and gas-phase polymerisation using conventional catalysts. Ziegler Natta catalysts as well as metallocene catalysts are suitable catalysts.

A widely used process is the solution polymerisation. Ethylene, propylene and catalyst systems are polymerised in an excess of hydrocarbon solvent. Stabilisers and oils, if used, are added directly after polymerisation. The solvent and unreacted monomers are then flashed off with hot water or steam, or with mechanical devolatilisation. The polymer, which is in crumb form, is dried with dewatering in screens, mechanical presses or drying ovens. The crumb is formed into wrapped bales or extruded into pellets.

The suspension polymerisation process is a modification of bulk polymerisation. The monomers and catalyst system are injected into the reactor filled with propylene. The polymerisation takes place immediately, forming crumbs of polymer that are not soluble in the propylene. Flashing off the propylene and comonomer completes the polymerisation process.

The gas-phase polymerisation technology consists of one or more vertical fluidised beds. Monomers and nitrogen in gas form along with catalyst are fed to the reactor and solid product is removed periodically. Heat of reaction is removed through the use of the circulating gas that also serves to fluidise the polymer bed. Solvents are not used, thereby eliminating the need for solvent stripping, washing and drying.

The production of ethylene propylene rubber is also described in detail in e.g. U.S. Pat. No. 3,300,459, U.S. Pat. No. 5,919,877, EP 0 060 090 A1 and in a company publication by EniChem "DUTRAL, Ethylene-Propylene Elastomers", pages 1-4 (1991).

Polymerization of a Heterophasic Propylene-Ethylene Random Copolymer (RAHECO)

Accordingly, for the production of a heterophasic propylene-ethylene random copolymer it is preferred to use a multistage polymerisation process which utilises, firstly, a reactor setup as outlined above, i.e. a polymerisation process based on a first polymerisation step in at least one slurry reactor and an optional second polymerisation step preferably comprising at least one gas phase reactor, for producing the random propylene copolymer, and, secondly, at least one additional polymerisation step(s) in one or more gas phase reactors.

A preferred reactor setup is a combination of bulk slurry loop reactor(s) and gas phase reactor(s), particularly one loop reactor and one gas phase reactor (random copolymer in loop and EPR in gas phase) or two loop reactors and one or two gas phase reactors (random copolymer in loops and EPR in gas phases) or one loop and two gas phases (random copolymer in loop and EPR in gas phases or random copolymer in loop and first gas phase and EPR in second gas phase) or one loop and three gas phases (random copolymer in loop and first gas phase and EPR in second and third gas phases).

The produced random copolymer is transferred into a gas phase reactor, where EPR is produced, afterwards the product is optionally transferred into a further gas phase reactor, where an optional further (or final) part of the EPR is produced.

The monomer feed (especially ethylene) to the gas phase reactor(s) where the EPR is produced is adjusted such that the final ethylene content of the RAHECO is between 6-30 wt %. Further, the monomer feed (especially ethylene) to the gas phase reactor(s) where the EPR is produced is adjusted such that the final ethylene content of the xylene soluble fraction of the RAHECO is between 20-60 wt %.

After the polymerisation is finished, the polymer product (RAHECO) is recovered by conventional procedures. The resulting polymer particles may be pelletised in a conventional compounding extruder with various additives, which are generally used in thermoplastic polymer compositions, such as stabilisers, antioxidants, acid neutralising agents, ultraviolet absorbers, antistatic agents.

Heterophasic propylene copolymers may be produced in an analogous manner, with the exception, that no comonomer (ethylene) is fed to the first polymerization step(s) where the matrix polymer is produced.

Optionally, additives conventionally used in such polypropylene compositions, for example antioxidants, neutralizer, inorganic fillers, anti-blocking agents, nucleating agents, lubricants or antistatic agents, may be added to the composition before, during or after the blending step of the polymer components in a manner known in the art. Usually, the amount of such conventional additives is 10 wt % or less, preferably 5 wt % or less, of the total polymer composition.

The polypropylene composition can be used in various applications, like film or injection moulding application, which are produced by any method known in the art.

Furthermore, the produced film of the present invention may be a cast or blown film consisting of one or more layers, wherein at least one layer comprises the polypropylene composition of the present invention, and can be non-oriented or mono- or biaxially oriented.

FIGURES

FIG. 1 shows the melting temperature and the part of the sample which is molten at 121° C. with varying content of ethylene in the matrix resin for samples taken from films comprising polymer compositions according to the invention (measured by DSC). More details are given in the Examples section. The term "expected run of the curve" refers to the expected linear evolution of a given parameter for pure random copolymers or heterophasic propylene copolymers with a matrix constituted of neat random copolymer FIG. 2 shows the haze of films according to the invention with varying content of ethylene in the matrix resin before and after heat sterilization. More details are given in the Examples section.

EXAMPLES SECTION

Figure 1:
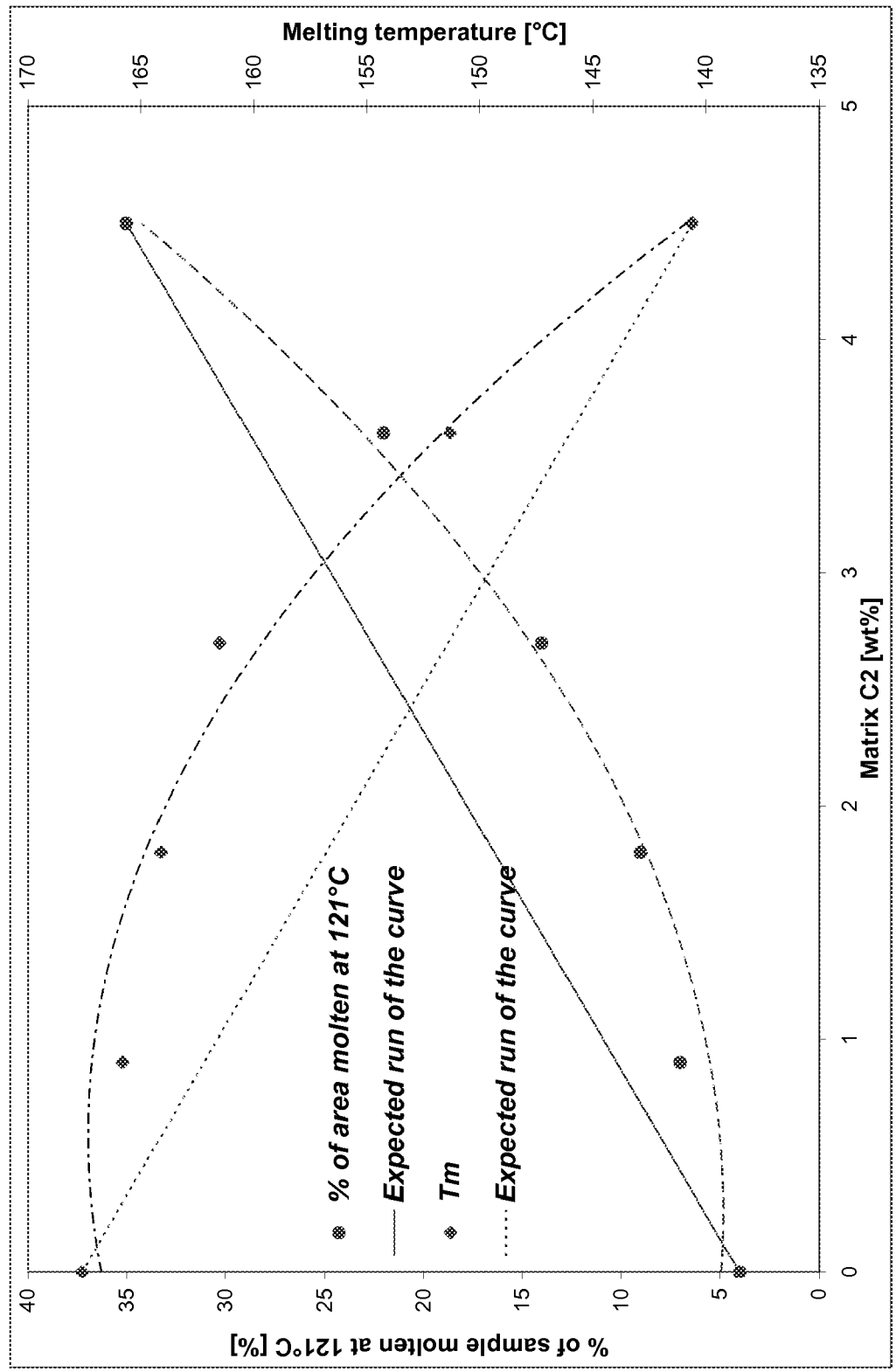
Figure 2:
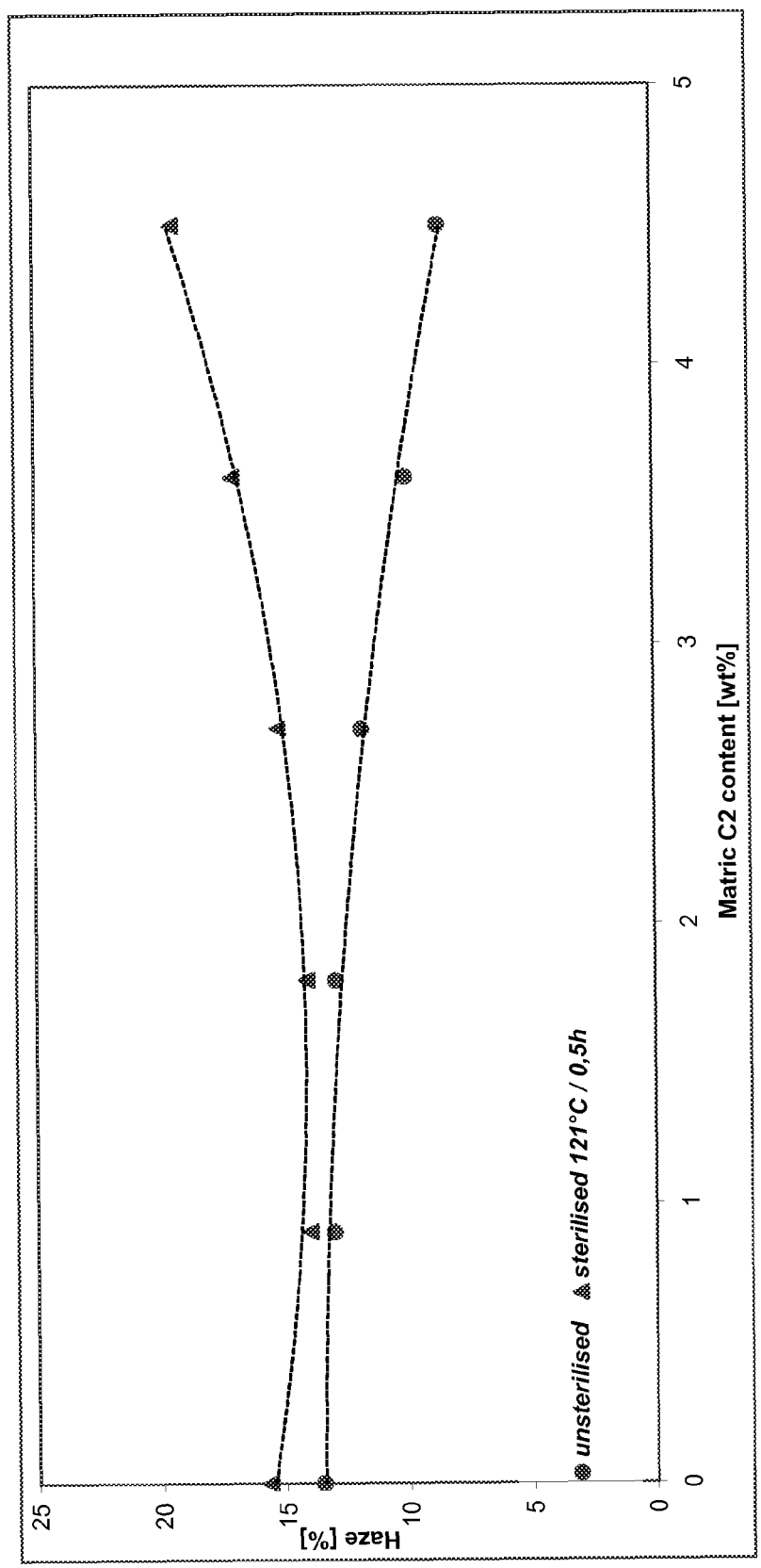
Figure 3:
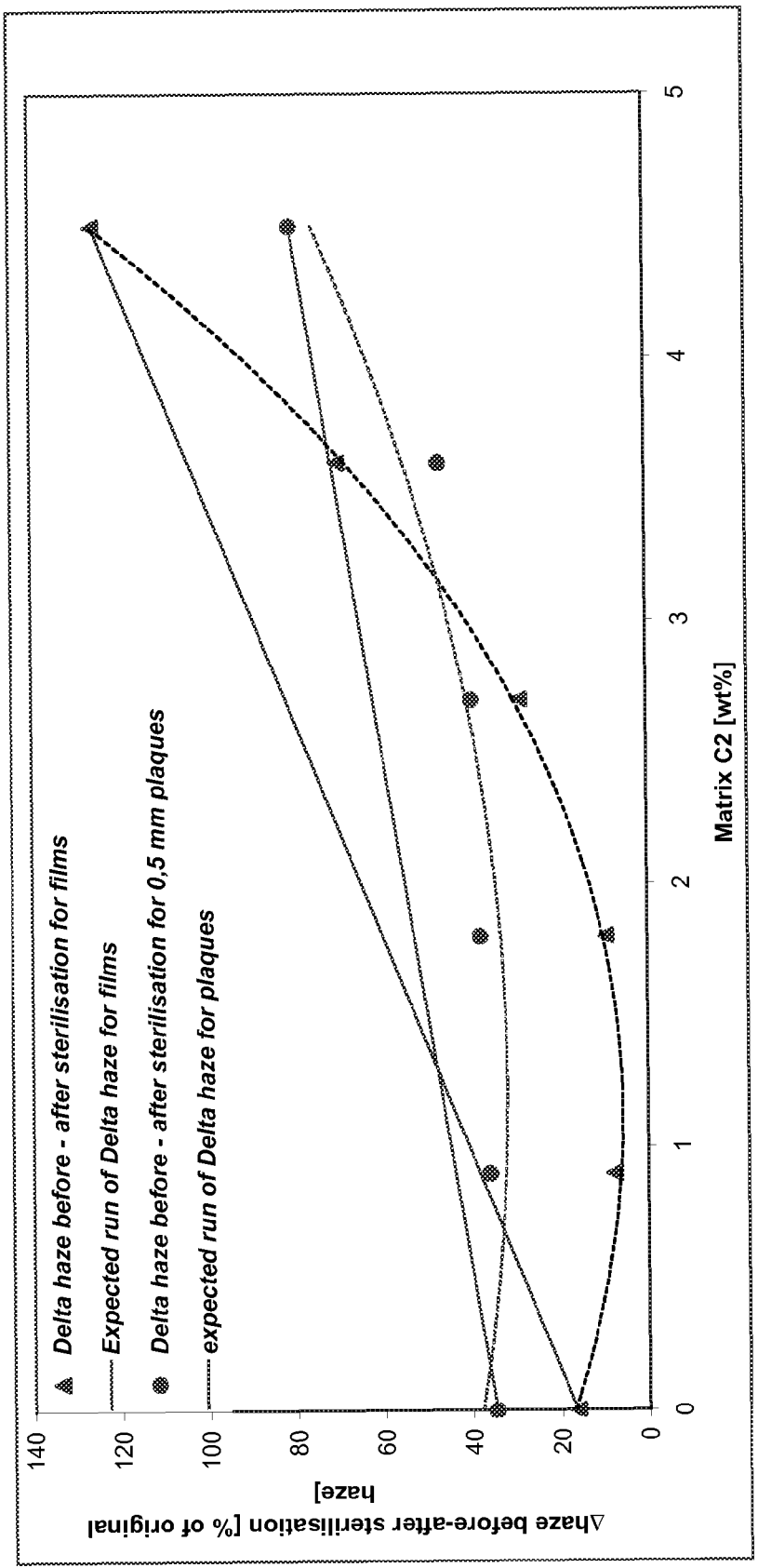
FIG. 3 shows Δ(haze) of the same films and of plaques with varying content of ethylene in the matrix resin before and after heat sterilization. More details are given in the Examples section.
Figure 4:
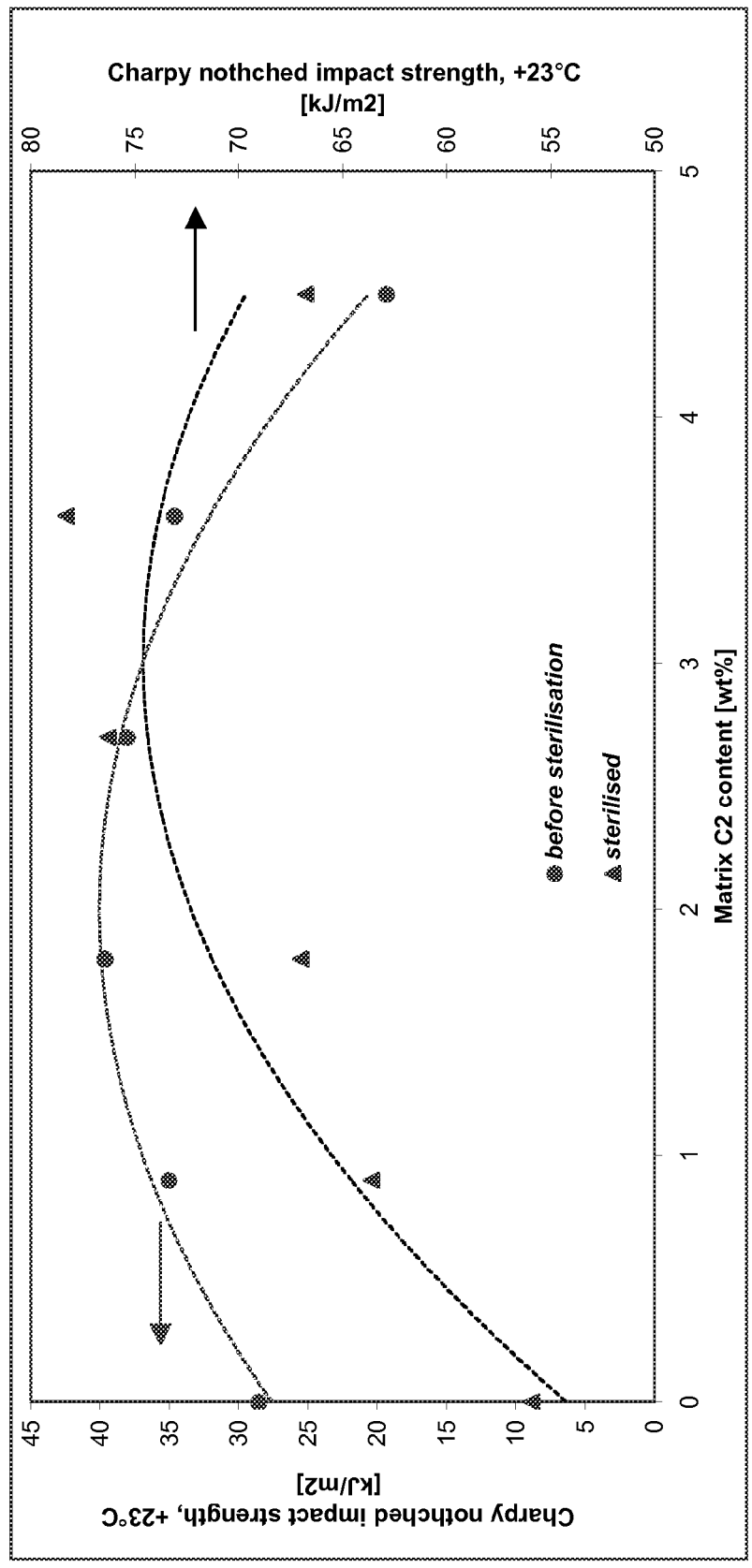
FIG. 4 shows the impact strength of samples comprising polymer compositions according to the invention with varying content of ethylene in the matrix resin before and after heat sterilization. More details are given in the Examples section.
Figure 5:
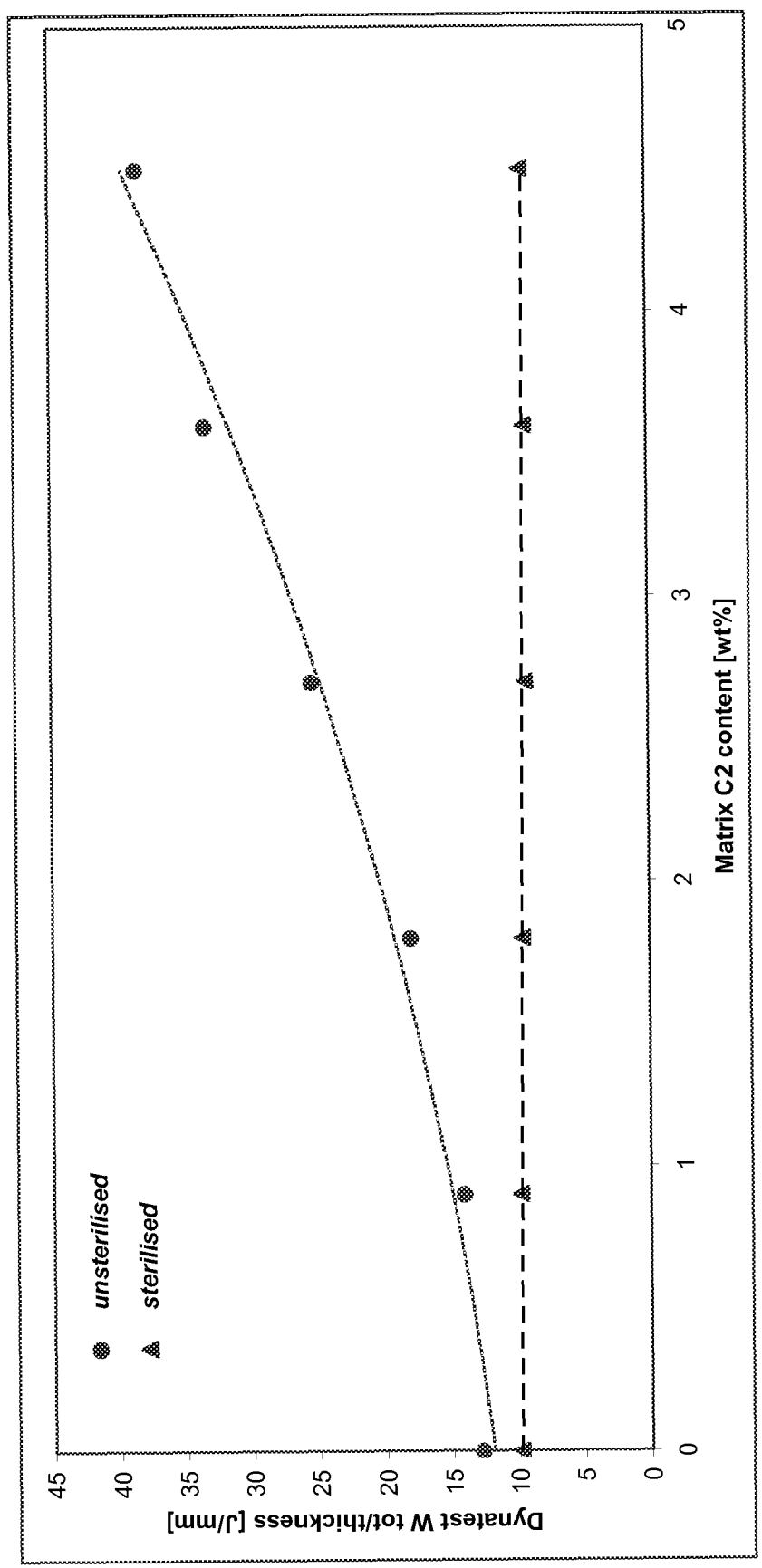
FIG. 5 shows the impact strength of films according to the invention with varying content of ethylene in the matrix resin before and after heat sterilization. More details are given in the Examples section.

1. Measurement Methods a) Melt flow rate

The melt flow rate is determined according to ISO 1133 and it is indicated in g/10 min. The MFR is an indication of the flowability and thus the processability of the polymer. The higher the melt flow rate, the lower the viscosity of the polymer. The MFR of propylene compositions and polymers is measured with a load of 2.16 kg at 230° C.

b) Impact Strength of Injection Moulded Specimens (Charpy)

The impact strength is determined as Charpy Notched Impact Strength according to ISO 179-1 eA at +23° C. and at −20° C. on injection moulded specimens of 80×10×4 mm prepared according to EN ISO 1873-2.

c) Impact Strength of Films (Dynatest)

The impact strength of films is determined according to ISO 7765-2 at 23 C on monolayer cast films with a thickness of 100 μm.

d) Flexural Modulus

The flexural modulus was determined according to ISO 178 on injection moulded specimens of 80×10×4 mm prepared according to EN ISO 1873-2.

e) Transparency of Films

Transparency of films was measured according to ASTM D 1003/92 on monolayer cast films with a thickness of 100 μm.

f) Haze of Plaques

Haze of plaques was determined according to ASTM D 1003/92 on injection moulded plaques of 60×60×0.5 mm prepared according to EN ISO 1873-2.

g) Haze of Films

Haze of films was measured according to ASTM D 1003/92 on monolayer cast films with a thickness of 100 μm.

h) Δ(haze)

The value of Δ(haze) is obtained by dividing the difference between the haze after heat sterilization and the haze before heat sterilization with the haze before heat sterilization, multiplied by 100.

i) Melting Temperature

The melting temperature is determined by differential scanning calorimetry (DSC) according to ISO 3146; it is taken as the maximum of the melting peak over the temperature during the second heating scan of a sequence heating/cooling/heating of +10/−10/+10 K/min.

j) Part of the Sample which is Molten at 121° C.

The part of the sample which is molten at 121° C. is extracted from the DSC trace of the second heating scan determined according to ISO 3146; it represents the fraction of the area of the propylene homopolymer or propylene random copolymer peak up to 121° C. of out of the total area of the melt enthalpy of the propylene homopolymer or propylene random copolymer.

k) Comonomer Contents

Comonomer contents were measured with Fourier transform infrared spectroscopy (FTIR) calibrated with $^{13}$C-NMR.

l) Intrinsic Viscosity

Intrinsic Viscosity was measured according to DIN ISO 1628-1 (October 1999) in decalin at 135° C.

m) Xylene solubles (XS)

Xylene solubles were determined at 23° C. according ISO 6427.

2. Polymer Compositions

In order to systematically investigate the effect of different matrix ethylene contents on transparency, impact resistance and sterilisation resistance, six different polymer compositions were produced by mixing different amounts of the following two polymer compositions:

a) a heterophasic propylene-ethylene random copolymer. Its matrix (87 wt % of the heterophasic propylene-ethylene random copolymer) is a random copolymer containing 4.5 wt % of ethylene, having an $MFR_2$ of 3.5 g/10 min and a xylene soluble content (XS) of 7 wt %. Its rubber phase is an ethylene-propylene rubber. The xylene soluble content ($XS_{total}$) of the total heterophasic propylene-ethylene random copolymer is 20 wt %. The intrinsic viscosity of $XS_{total}$ is 1.7 dl/g and the propylene content of $XS_{total}$ is i about 65 wt %. $MFR_2$ of the heterophasic propylene-ethylene random copolymer is 3.2 g/10 min.

b) a heterophasic propylene copolymer. Its matrix (87 wt % of the heterophasic propylene copolymer) is a propylene homopolymer with no ethylene, having an $MFR_2$ of 3.5 g/10 min and a xylene soluble content (XS) of 1.5 wt %. Its rubber phase is an ethylene-propylene rubber. The xylene soluble content ($XS_{total}$) of the total heterophasic propylene copolymer is 14 wt %. The intrinsic viscosity of $XS_{total}$ is 1.7 dl/g and the propylene content of $XS_{total}$ is about 65 wt %. $MFR_2$ of the heterophasic propylene copolymer is 3.0 g/10 min Both resins are commercially available from Borealis Polyolefine GmbH, Austria, under the trade names SC220CF (a) and BC914TF (b), respectively.

Component (A) comes from the matrix of the block copolymer. Component (B) comes from the matrix of the propylene-ethylene random copolymer. Finally, component (C) is the rubber of both copolymers.

Compounding

All compounds were produced on a PRISM TSE 24 twin-screw extruder (producer: Thermo Electron, Germany). All materials were stabilized with 0.05 wt % of Tris(2,4-di-t-butylphenyl)phosphite (Irgafos 168 (supplier: Ciba Speciality Chemicals)).

The films were produced in cast film technology on a PM 30 film extruder (producer: Plastik-Maschinenbau Geng-Mayer GmbH, Germany), with a barrel diameter of 30 mm and a slot die of 200×0.55 mm in combination with a chill- and a takeup-roll. Melt temperature was 260° C. in the die; the chill-roll was kept at 15° C. and the takeoff roll at 20° C. A film thickness of 100 μm was adjusted through the ratio between extruder output and takeoff speed.

3. Examples

The following table shows properties and test results of the six different polymer compositions produced. Examples 1 (matrix which is a pure random copolymer) and 6 (matrix which is a pure homopolymer) are comparative Examples.

The Examples show that the haze of the films decreases with increasing content of ethylene in the matrix. In the same direction the impact strength increases. Insofar the films comprising the heterophasic polypropylene compositions according to the present invention behave similar as known from films made of compositions of the prior art. It can also be seen that Example 1 (comparative) shows the best haze and the best impact strength due to its high content of ethylene in the matrix and the matrix being composed of a copolymer only.

After the step of heat sterilization, however, Example 1 shows the worst haze which is not acceptable in the field of medicals and food packaging. Even if the haze of Examples 2 to 5 according to the invention is higher before the step of heat sterilization than the haze of Example 1, after the step of heat sterilization the increase in haze is not as strong as in Example 1 and the haze is also less than in Example 1. This can perfectly be seen when looking at the values of Δ(haze).

After the step of heat sterilization the impact strength of the films generally decreases. The inventive Examples show values which are in the same range as the comparative Examples.

The combination of properties haze (before and after sterilisation) and stiffness is satisfactory only for the inventive examples.

The plaques behave different. Before the step of heat sterilization the haze decreases with increasing content of ethylene, however, after the step of heat sterilization the worse haze is on the same level in all Examples. However, the

| | | Example | | | | | |
|---|---|---|---|---|---|---|---|
| | | 1 | 2 | 3 | 4 | 5 | 6 |
| SC220CF | wt % | 100 | 80 | 60 | 40 | 20 | 0 |
| BC914TF | wt % | 0 | 20 | 40 | 60 | 80 | 100 |
| C2 content of matrix | wt % | 4.5 | 3.6 | 2.7 | 1.8 | 0.9 | 0 |
| MFR$_2$ of matrix | g/10 min | 3.5 | 3.5 | 3.5 | 3.5 | 3.5 | 3.5 |
| MFR$_2$ of polymer composition | g/10 min | 3.2 | 3.1 | 3.0 | 3.2 | 3.2 | 3.0 |
| Intrinsic viscosity of XS | dl/g | 1.7 | 1.7 | 1.7 | 1.7 | 1.7 | 1.7 |
| C3 content of XS | wt % | 65 | 65 | 65 | 65 | 65 | 65 |
| Melting temperature | ° C. | 140.6 | 156.8 | 161.5 | 164.1 | 165.8 | 167.6 |
| Part of sample molten at 121° C. | % | 35 | 22 | 14 | 9 | 7 | 4 |
| 100 μm film, unsterilised | | | | | | | |
| Transparency | % | 93.6 | 93.6 | 93.6 | 93.6 | 93.5 | 93.4 |
| Haze | % | 8.6 | 10.0 | 11.8 | 12.9 | 13.0 | 13.5 |
| Impact strength | J/mm | 38.4 | 33.3 | 25.4 | 18.0 | 14.0 | 12.8 |
| 100 μm film, sterilized at 121° C., 0.5 h | | | | | | | |
| Transparency | % | 91.6 | 91.6 | 91.6 | 91.9 | 92.0 | 92.1 |
| Haze | % | 19.4 | 17.0 | 15.2 | 14.1 | 14.0 | 15.7 |
| Δ(haze) | % | 125.6 | 70.0 | 28.8 | 9.3 | 7.7 | 16.3 |
| Impact strength | J/mm | 9.5 | 9.3 | 9.3 | 9.6 | 9.8 | 9.9 |
| Charpy impact strength, unsterilised | | | | | | | |
| +23° C. | kJ/m$^2$ | 19.3 | 34.6 | 38.0 | 39.6 | 35.0 | 28.5 |
| −20° C. | kJ/m$^2$ | 1.8 | 1.7 | 1.6 | 1.6 | 1.8 | 1.7 |
| Charpy impact strength, sterilized at 121° C., 0.5 h | | | | | | | |
| +23° C. | kJ/m$^2$ | 66.8 | 78.3 | 76.3 | 67.0 | 63.6 | 55.9 |
| −20° C. | kJ/m$^2$ | 1.3 | 1.3 | 1.2 | 1.7 | 1.6 | 1.5 |
| Flexural test ISO 178 | | | | | | | |
| Flexural Modulus, unsterilised | MPa | 535 | 759 | 895 | 1034 | 1198 | 1388 |
| Flexural Modulus, sterilized at 121° C., 0.5 h | MPa | 575 | 745 | 886 | 1043 | 1230 | 1446 |
| Haze of plaques (60 × 60 × 0.5 mm) | | | | | | | |
| unsterilised | % | 21.4 | 29.1 | 29.3 | 30.1 | 30.7 | 31.5 |
| sterilized, 121° C., 0.5 h | % | 38.6 | 42.7 | 40.9 | 41.5 | 41.7 | 42.4 |
| Δ(haze) | % | 80.4 | 46.7 | 39.6 | 37.9 | 35.8 | 34.6 | impact strength is improved after the step of heat sterilization and is the best in the Examples having the highest content of ethylene in the matrix.

We claim:

1. Cast film comprising a heterophasic polypropylene composition comprising a matrix resin which comprises
    (A) 10-85 wt % of a propylene homopolymer with an $MFR_2$ of 0.5-20 g/10 min and
    (B) 10-85 wt % of a propylene-ethylene random copolymer with an $MFR_2$ of 0.5-20 g/10 min;
    wherein the ethylene content of the matrix resin is 0.5-3.0 wt % based on the entire matrix without any additives;
    and a dispersed phase which comprises
    (C) 5-30 wt % of an ethylene-propylene rubber,
wherein the xylene soluble content of the heterophasic polypropylene composition has an intrinsic viscosity of 1-2 dl/g and a content of propylene of more than 50 wt %, wherein an impact strength of the cast film is at least 13 J/mm according to ISO 7765-2.

2. Cast film according to claim 1, wherein the melting point of the heterophasic polypropylene composition is at least 145° C.

3. Cast film according to claim 1, wherein the cast film is sterilized.

4. Cast film according to claim 1, wherein the content of comonomer in the matrix resin is at least 0.8 wt % based on the entire matrix resin without any additives.

5. Cast film according to claim 1 having a haze of below 13.5% measured on a 100 μm cast film.

6. Cast film according to claim 1 having a haze of below 17% measured on a 100 μm cast film after a step of heat sterilization at 121° C. for 0.5 h.

7. Cast film according to claim 1 having a Δ(haze) value of 70% or less.

8. Cast film comprising a heterophasic polypropylene composition comprising a matrix resin which comprises
    (A) 10-85 wt % of a propylene homopolymer with an $MFR_2$ of 0.5-20 g/10 min and
    (B) 10-85 wt % of a propylene-ethylene random copolymer with an $MFR_2$ of 0.5-20 q/10 min;
    wherein the ethylene content of the matrix resin is 0.5-3.0 wt % based on the entire matrix without any additives;
    and a dispersed phase which comprises
    (C) 5-30 wt % of an ethylene-propylene rubber,
wherein the xylene soluble content of the heterophasic polypropylene composition has an intrinsic viscosity of 1-2 dl/g and a content of propylene of more than 50 wt %, wherein the impact strength of the cast film after a step of heat sterilization at 121° C. for 0.5 h is at least 9.0 J/mm according to ISO 7765-2.

* * * * *

UNITED STATES PATENT AND TRADEMARK OFFICE
CERTIFICATE OF CORRECTION

| | |
|---|---|
| PATENT NO. | : 8,173,747 B2 |
| APPLICATION NO. | : 12/733082 |
| DATED | : May 8, 2012 |
| INVENTOR(S) | : Christelle Grein and Tonja Schedenig |

It is certified that error appears in the above-identified patent and that said Letters Patent is hereby corrected as shown below:

Column 6,
Lines 1-2, "The haze of the inventive heterophasic polypropylene composition is preferably 40%, more preferably 31%" should be
-- The haze of the inventive heterophasic polypropylene composition is preferably ≤ 40%, more preferably ≤ 31% --.

Signed and Sealed this
Ninth Day of April, 2013

Teresa Stanek Rea
*Acting Director of the United States Patent and Trademark Office*